(12) United States Patent
Elder

(10) Patent No.: US 6,448,669 B1
(45) Date of Patent: Sep. 10, 2002

(54) WATER POWER GENERATION SYSTEM

(76) Inventor: Dillyn M. Elder, 1513 E. Lake St., Fort Collins, CO (US) 80524

( * ) Notice: Subject to any disclaimer, the term of this patent is extended or adjusted under 35 U.S.C. 154(b) by 0 days.

(21) Appl. No.: 09/789,961

(22) Filed: Feb. 20, 2001

Related U.S. Application Data

(63) Continuation-in-part of application No. 09/452,734, filed on Dec. 1, 1999, now Pat. No. 6,191,496.
(60) Provisional application No. 60/110,519, filed on Dec. 1, 1998.

(51) Int. Cl.[7] .................................................. F03D 3/04
(52) U.S. Cl. ............................................ 290/54; 290/43
(58) Field of Search .............................. 290/43, 44, 54, 290/55

(56) References Cited

U.S. PATENT DOCUMENTS

| | | |
|---|---|---|
| 143,100 A | 9/1873 | Sheplar et al. |
| 175,530 A | 3/1876 | Vernor |
| 201,400 A | 3/1878 | Everhart |

(List continued on next page.)

FOREIGN PATENT DOCUMENTS

| | | | |
|---|---|---|---|
| DE | 867380 | 2/1953 | |
| EP | 167694 | 1/1986 | ................. 415/4.2 |
| EP | 0216384 | 4/1987 | |
| FR | 515652 | 4/1921 | |
| FR | 727519 | 3/1931 | |
| FR | 61140 | 3/1955 | ................. 416/236 |
| GB | 2231805 A | 11/1990 | |
| JP | 55-69701 | 5/1980 | ............. 416/197 A |

OTHER PUBLICATIONS

U.S. patent application Ser. No. 09/452,734, "Improved Wind Turbine System", filed Dec. 1, 1999, 28 pages and 11 drawings.

U.S. Provisional Application, 60/110,519, "Improved Wind Turbine System", filed Dec. 1, 1998, 11 pages and 11 drawings.

*Primary Examiner*—Nicholas Ponomarenko

(57) ABSTRACT

The present invention relates to a turbine used to convert wind or fluid energy, and in some embodiments the kinetic energy of water, into mechanical energy, more specifically, a long axis type of vertical-axis turbine allowing large columns of air or water to be harnessed. These devices differ from horizontal-axis (propeller) type windmills or watermills which typically rotate about a vertical axis in order that they may face directly into a wind. The present invention is designed to be employed as a cost effective alternate power source in any wind or water current condition from a breeze to a gale wind, to a slow to moderate to fast water currents. To increase the structural integrity, the torque generating elements, namely, the rotor blades, are not directly attached to the shaft but rather, they attach to the round top and bottom rotor cage plates through which torque forces generated can be transferred to the shaft. The unique design of an open cover on the top of the wind or water turbine allows wind or water from the direction above the turbine to be harnessed. The top shield structure has created a calm wind or water area between the shield and the top of the rotor cage that helps reduce turbidity and greatly facilitates wind or water exhaust from the system.

70 Claims, 12 Drawing Sheets

U.S. PATENT DOCUMENTS

| | | | |
|---|---|---|---|
| 399,171 A | 3/1889 | Townsend | |
| 455,858 A | 7/1891 | Pepper | 416/197 A |
| 485,933 A | 11/1892 | Herman | |
| 535,193 A | 3/1895 | Chapman | |
| 537,494 A | 4/1895 | Stevens et al. | 415/907 |
| 588,572 A | 8/1897 | Hardaway | |
| 600,893 A | 3/1898 | Schmucker | |
| 640,901 A | 1/1900 | Hardaway | |
| 993,120 A | 5/1911 | Sterner | |
| 1,523,295 A | 1/1925 | Ryan | |
| 1,583,165 A | 5/1926 | Nicholson | 416/236 R |
| 1,615,675 A | 1/1927 | Bender | |
| 1,758,560 A | 5/1930 | Currie | 416/236 R |
| 1,835,018 A | 12/1931 | Darrieus | |
| 1,935,097 A | 11/1933 | Nelson | 170/15 |
| 2,067,542 A | 1/1937 | Penton | 170/12 |
| 2,406,268 A | 8/1946 | Terhune | 170/26 |
| 3,339,078 A | 8/1967 | Crompton | 290/44 |
| 3,902,072 A | 8/1975 | Quinn | 290/44 |
| 3,942,909 A | 3/1976 | Yengst | 416/132 B |
| 3,970,409 A | 7/1976 | Luchuk | 416/145 |
| 3,994,621 A | 11/1976 | Bogle | 415/186 |
| 4,031,405 A | 6/1977 | Asperger | 290/55 |
| 4,035,658 A | 7/1977 | Diggs | 290/55 |
| 4,045,144 A | 8/1977 | Loth | 415/1 |
| 4,075,500 A | 2/1978 | Oman et al. | 290/55 |
| 4,140,433 A | 2/1979 | Eckel | 415/2 |
| 4,168,439 A | 9/1979 | Palma | 290/44 |
| 4,204,799 A | 5/1980 | de Geus | 415/2 |
| 4,247,252 A | 1/1981 | Seki et al. | 416/44 |
| 4,247,253 A | 1/1981 | Seki et al. | 416/44 |
| 4,291,233 A | 9/1981 | Kirschbaum | 290/1 C |
| 4,362,470 A | 12/1982 | Lacastro et al. | 416/197 A |
| 4,415,814 A | 11/1983 | Martinez | 290/55 |
| 4,474,529 A | 10/1984 | Kinsey | 415/2 R |
| 4,551,631 A | 11/1985 | Trigilio | 290/55 |
| 4,571,152 A | 2/1986 | Tater | 415/4 |
| 4,632,637 A | 12/1986 | Traudt | 416/41 |
| 4,652,206 A | 3/1987 | Yeoman | 415/4 |
| 4,695,736 A | 9/1987 | Doman et al. | 290/44 |
| 4,748,339 A | 5/1988 | Jamieson | 290/55 |
| 4,818,181 A | 4/1989 | Kodric | 416/196 A |
| 4,834,610 A | 5/1989 | Bond, III | 415/3 |
| 4,850,792 A | 7/1989 | Yeoman | 415/4.2 |
| 5,083,039 A | 1/1992 | Richardson et al. | 290/44 |
| 5,380,149 A | 1/1995 | Valsamidis | 415/2.1 |
| 5,391,926 A | 2/1995 | Staley et al. | 290/55 |
| 5,503,530 A | 4/1996 | Walters | 416/197 A |
| 5,852,331 A | 12/1998 | Giorgini | 290/55 |
| 6,191,496 B1 * | 2/2001 | Elder | 290/44 |

* cited by examiner

WATER POWER GENERATION SYSTEM

This continuation-in-part application claims priority to the U.S. non-provisional application Ser. No. 09/452,734, filed Dec. 1, 1999, now U.S. Pat. No. 6,191,496 which in turn claims the benefit of provisional application Ser. No. 60/110,519, filed on Dec. 1, 1998, the contents of each that application are hereby incorporated by reference.

BACKGROUND OF THE INVENTION

The present invention relates to water turbines generally, used to convert water kinetic energy into mechanical energy, and more specifically, vertical-axis turbines. Although from some perspectives it is a different problem, the invention may, perhaps surprisingly, present understandings which can also apply to the field of wind power generation and vice versa. The present invention may specifically be related to turbine systems used in power generation from such resources as wind or moving or running water. Although the present invention may be described herein, in accordance with certain embodiments, with regard to the conversion of wind energy, it should be understood that the disclosed concepts of turbine systems and power generation may also be applicable to other fluidic resources, such as moving or running water, even though the two fields can be considered very different in the art from some perspectives.

Vertical-axis turbines are typically of a long axis type, allowing large columns of air to be harnessed. These devices differ from horizontal-axis (propeller) type windmills which typically pivot about a vertical axis in order that they may face directly into a wind. The present invention more specifically relates to vertical-axis turbines designed to be employed as a cost effective alternate power source in any wind condition.

Wind as a source of energy is a concept that has been promoted for some time. According to one source, there is evidence which shows that windmills were in use in Babylon and in China as early as 2000 B.C. The U.S. Patent and Trademark Office has granted patents on windmill devices dating back to the early to mid 1800's. Despite the continued research and development in this age old technology, until the present invention, no windmill or wind turbine device has successfully appropriately addressed some of the most important problems which have seemingly made the harnessing of wind not economically feasible. While wind is unquestionably a large potential source of energy, estimated to be about 5 kW per acre in the United States, its variability in velocity has made it an unreliable source. Many devices such as U.S. Pat. Nos. 4850792 to Yeoman, 4,035,658 to Diggs and 2,406,268 to Terhune have relied on the ability of concentrating low to moderate winds for producing power. Others, like those shown in U.S. Pat. Nos. 4,834,610 to Bond and 4,075,500 to Oman, et al. (a horizontal-axis turbine), have accomplished the harnessing variable wind speeds by using modem variable speed governors. No device currently known to the present inventors is capable of adequately harnessing low and high-winds for power production. High winds are characterized, for purposes of discussion as currents having average velocities above 45 m.p.h., or having gusts greater than 60 m.p.h. Many devices are designed to fold and/or feather in winds reaching certain levels. Such devices are illustrated in U.S. Pat. Nos. 4,818, 181 to Kodric, 4,632,637 to Traudt, and 3,942,909 to Yengst. These techniques, while intended to protect the structural integrity of the windmill, decrease a device's ability to produce power. Others, such as Pat. No. 5,391,926 to Staley and Elder, attempt to harness high winds emanating from any direction for power production but low to moderate winds have been unable to produce adequate torque for continual reliable power generation. Until the present invention variable winds have been an untapped source of energy by those skilled in the relevant art.

In the past, wind driven power generators of all sorts have attempted to harness the energy present in the wind. Some have concentrated their efforts in the low to moderate wind range and suffer periodic damage from the occasional high wind while others work well in the moderate to high wind range with little or no success in harnessing low speed wind. No prior art has effectively drawn useable power from the slight breeze all the way to gale force winds. Perhaps one of the biggest reasons for the lack of all wind turbines has to do with the structural integrity oftypical wind devices. By design many are lightweight, inadequately supported, and made from insufficient materials. A number of these devices are comprised of a multitude of moving parts, such as rotors, stators, vanes, shields, and the like. These parts not only compromise the integrity of the machine, but also require continuous maintenance, repair and/or replacement. For such a device, which may produce only a few kilowatts of power, the costs soon begin to outweigh the benefits. Another concept widely used is to build large multi-story wind turbines capable of producing at or near the megawatt level. Two such devices are shown in U.S. Pat. Nos. 3,902, 072 to Quinn, and 3,994,621 to Bogie. It is believed that these devices would cost close to $100 million to build and several hundred thousand to maintain each year. Another example is the 1.25 MW generator installed near Rutland, Vermont. This is believed to be the largest windmill ever built in the United States, having two main blades each 175 feet in diameter. This facility operated intermittently between 1941 and 1945, during the war years when most resources were being used for war efforts. In 1945 one of the blades broke due to material fatigue and was never repaired, presumably due to a lack of cost efficiency. Similar to the smaller units, these large devices become cost prohibitive on a much larger scale. The present invention solves this second problem by presenting a low cost, low maintenance, cost efficient wind turbine. While certain aspects of the design have been known, until the present invention the proper combination of elements, new and old, has not been achieved to provide a commercially viable product.

Variable wind velocity is not, of course, the only obstacle in harnessing kinetic energy from the wind. Wind direction has been another area of study and development. Wind currents are typically unpredictable, and due to topography, upper air disturbances, changing weather patterns, or seasonal variations, they rarely blow in the same direction for any substantial length of time. For this reason effective wind machines must be capable of immediately accommodating winds from a full 360 degrees. Some devices have attempted to accomplish this goal with pivoting shields, and stators or wind directing vanes. U.S. Pat. Nos. 4,474,529 to Kinsey, 5,37,494 to Stevens et al., the Yengst patent, and many other devices illustrate such an approach. As mentioned previously, additional moving parts usually detract from a machine's cost effectiveness. While not in the field of the present invention horizontal-axis machines typically pivot the entire rotor assembly so that it may face upwind. Still other designs leave the rotor assembly open (that is, no wind directing vanes or stators are utilized) so that winds from any horizontal direction may impart rotation upon the rotor assembly. This leaves the rotor completely open to the harshness and destructive abilities of the wind. Once again the present invention solves this problem by providing 360 degrees of wind reception, in all types of wind conditions.

The present invention, in its various embodiments, recognizes and addresses these and other problems and overcomes many limitations encountered by those skilled in the art. Many devices and procedures have taught the use of folding or feathering in high wind conditions, and thus have been unable to realize the potential power of high winds. Others, such as the Staley and Elder patent have attempted to address the damaging characteristics of high winds by stressing structural integrity and durability to the point of sacrificing the ability to produce adequate torque in the low to moderate wind speed range. It is not economically feasible to build a wind turbine that can only produce mechanical power during periods of high wind. The entire range of wind conditions must be fully utilized for a wind turbine to be commercially viable. Problems such as high cost and high maintenance of most wind energy facilities exist in the field, but such problems have not been adequately addressed by those skilled in the art. While high velocity wind is a well known natural occurrence with high kinetic energy, its value in the field of vertical-axis wind turbines has not only been ignored to some extent, it has often been looked upon as a detriment. The prior art has taught away from the present invention by stressing rotor attachment and stator curvature. Rather than supplying a system which affords only an incremental increase in performance over the prior art, the present invention utilizes techniques which were not previously considered in order to achieve what may perhaps be leaps in performance compared to the prior art. Further, the present invention has achieved a more full utilization of a previously untapped precious natural resource, the wind.

The present invention also provides, in various embodiments, systems which allow for other fluidic resources to be utilized in techniques that may not have been previously considered. The present invention further discloses systems and techniques for the conversion of energy from fluidic sources such as moving or running water. Prior attempts to harness water, for example, as a source of kinetic energy may have suffered from common issues related to fluidic energy conversion as identified above. The concepts and techniques of the present invention, therefore, provide turbine systems and techniques which may not only be directed to sources of energy such as water, but which may further address inadequacies of past efforts.

SUMMARY OF INVENTION

The present invention discloses, in some embodiments, a wind turbine to operate in all wind conditions, such as velocities up to 130 mph, and frequently changing wind directions. The device provides a reliable and effective means for directing air currents into and out of the rotor cage assembly. Rather than supplying a system which affords only an incremental increase in performance and design over the prior art, the present invention utilizes combinations and techniques which were not previously considered to achieve an increase in performance unparalleled by the prior art. This invention serves to operate with a minimum number of movable parts and systems, to optimize potential power production by allowing energy from high winds to be harnessed as well as low and moderate winds, and to optimize air current intake and exhaust by providing immediate accommodations to winds from any given direction.

In additional embodiments, the present invention discloses a fluid turbine, and in some embodiments a water turbine, operable in various moving or running fluidic conditions, and in some embodiments water conditions, such as slow to medium to fast water currents and frequently changing water current direction. Accordingly, the invention serves to operate with a minimum number of parts and systems, to optimize potential power production by allowing energy from fast or swift moving water currents or other fluid to be harnessed, as well as slow to medium or moderate currents, and to optimize water current intake and exhaust by providing immediate accommodations to water current from any given direction.

In general terms, the invention involves various embodiments of a vertical-axis wind turbine. Many of the elements of this device achieve several different objectives which, when combined, act to achieve the mentioned increases in performance. In the preferred embodiment, the invention discloses stationary stators for more effectively directing currents into the rotor cage assembly to impart a higher rotational velocity and greater torque upon the turbine shaft through some torque generating elements such as the rotor blades. In addition, the stationary stators provide a structural integrity necessary for operation during high wind conditions. This aspect also prevents the disruption of rotation by shielding the rotors from winds counter-directional to their rotation which may occur as the wind shifts. The invention, in additional embodiments, may further involve the above described concepts and features for vertical-axis water turbine.

Importantly, the invention breaks from several time honored traditions in harnessing wind and water energy. By recognizing and utilizing the potential energy of all winds and water currents, and by designing an apparatus with resistance to the destructiveness of these winds and water currents during standard operation the present invention achieves its goals.

Accordingly, the present invention provides an omni-wind, vertical-axis turbine. The stated invention acts to convert wind currents into mechanical energy which energy may then be transferred from a turbine or the like to be used to directly act upon a water pump, or to drive an electrical generator (or more generically an energy-utilizing device) for use as an alternate power source. The turbine may be equipped with any number of rotors and stators which interact with the variable wind currents during operation. In addition, a minimum number of moving parts is used to increase reliability, to decrease maintenance, and to decrease production costs. The invention, in additional embodiments, may further involve the above described concepts and features for vertical-axis water turbine.

It is an object of the present invention to provide a design which is capable of operation in a variety of wind conditions. Such conditions include, but are not limited to, winds from any direction which possess a horizontal component, even where such wind direction is capable of frequent changes, winds reaching velocities of 130 m.p.h. or more, and winds with continuously changing velocities. It is an object that the present invention be capable of standard operation during these conditions without any need for employing folding and feathering techniques, or a speed control or braking system. The invention, in additional embodiments, may further involve the above described concepts and features directed to particular water or other fluid characteristics for vertical-axis water turbine.

It is another object of the present invention to provide a design which is capable of immediately accommodating winds from any direction having a horizontal component, as stated earlier. It is an object that this immediate readiness of the present invention be achievable with no moving parts. The invention, in additional embodiments, may further involve the above described concepts and features for vertical-axis water turbine.

It is, therefore, an object of the present invention to provide a design which utilizes a minimum of moving parts for improved reliability. It is an object that necessary maintenance and replacement of any parts should be minimized, and the durability of the entire apparatus be vastly improved.

Additionally, it is an object of the present invention to provide a design which may be applicable to other fluid systems such as water or other fluids.

Naturally, further objects of the invention are disclosed throughout other areas of the specification and claims.

BRIEF DESCRIPTION OF DRAWINGS

Drawing 1 is a perspective view of an embodiment of the invention from the side.

Drawing 1A is a perspective of the new invention from the top.

Drawing 1B depicts a side view of a second embodiment of the invention.

Drawing 2 is a view of the rotor cage from the side.

Drawing 2A is a conceptual drawing of the rotor cage assembly from the side.

Drawing 3 is a perspective view of the rotor cage from the top showing the alignment of the rotor blades.

Drawing 4 is a view of the stator blades from the side.

Drawing 4A is a conceptual drawing of the stator blades from the side.

Drawing 4B is a top view of the stator blades showing their alignment.

Drawing 5 shows the stator cage cover which allows the invention to be "topless."

Drawing 6 is a view of the top shield from the side.

Drawing 7 is a perspective view of the top shield from above.

DETAILED DESCRIPTION OF THE PREFERRED EMBODIMENTS

The following descriptions and referenced drawings are for selected preferred embodiments of the present invention. Naturally, changes may be made to the disclosed embodiments while still falling within the scope and spirit of the present invention and the patent granted to its inventor.

Figure 1:
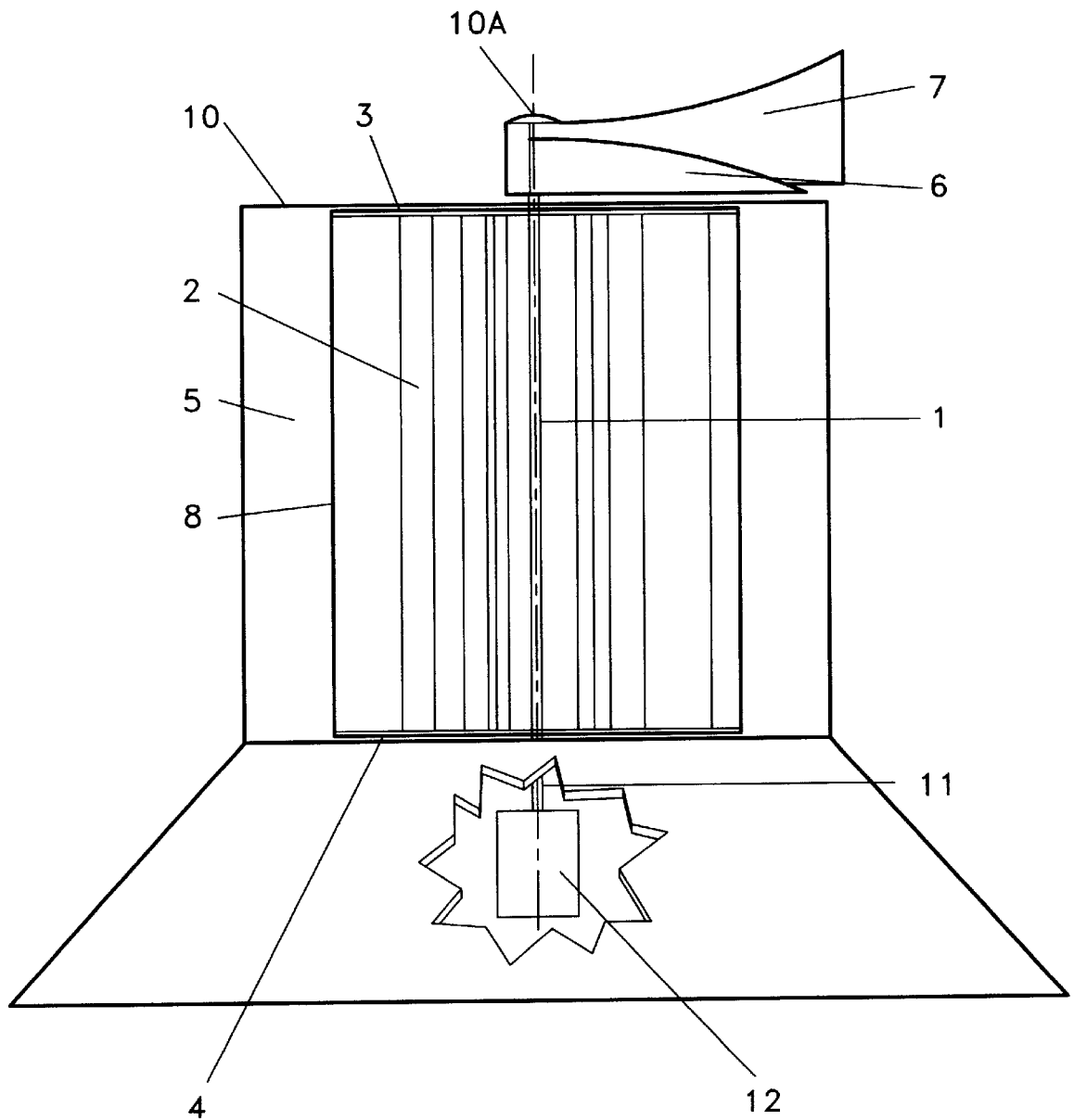
Figure 1A:
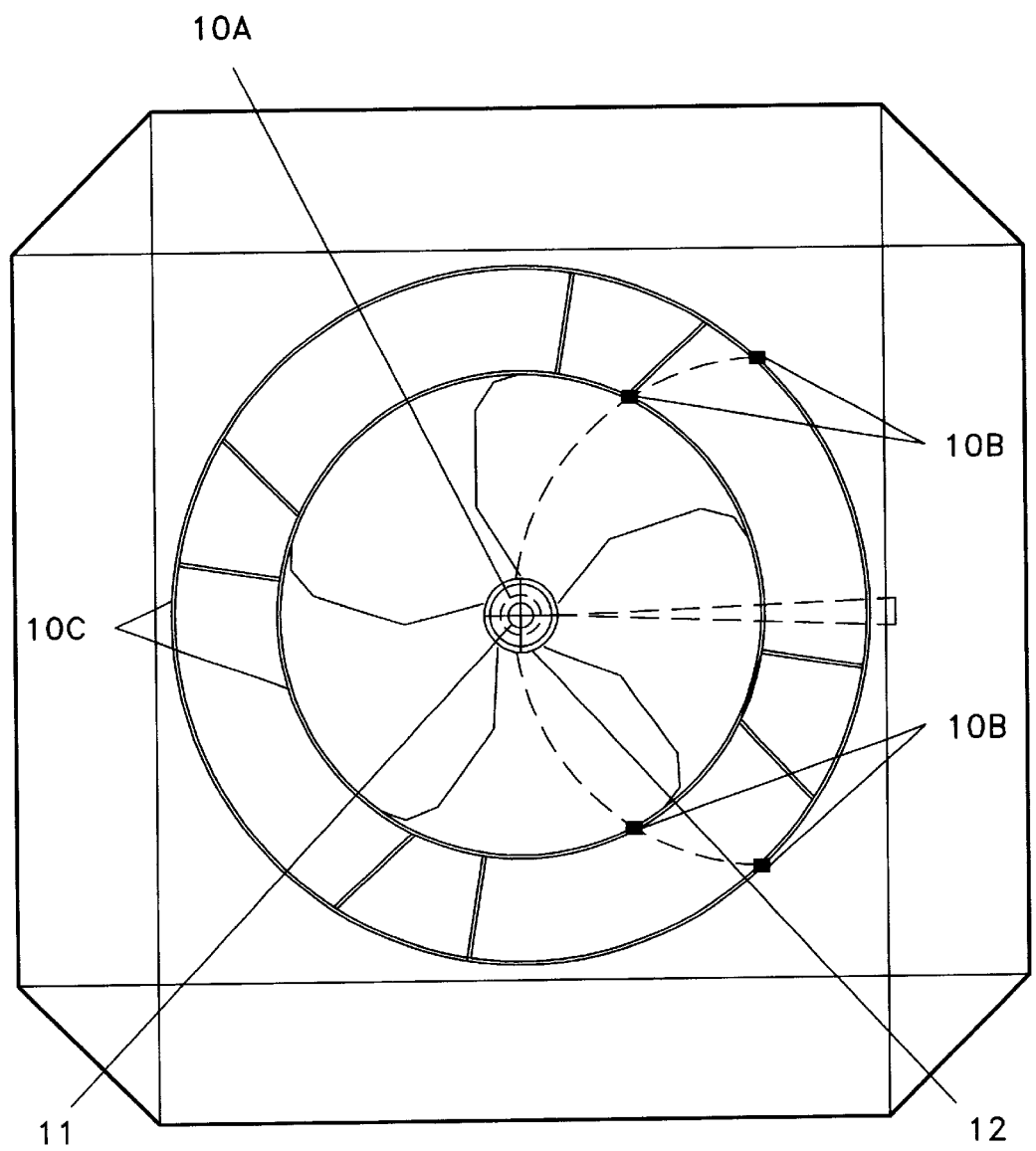
Figure 1B:
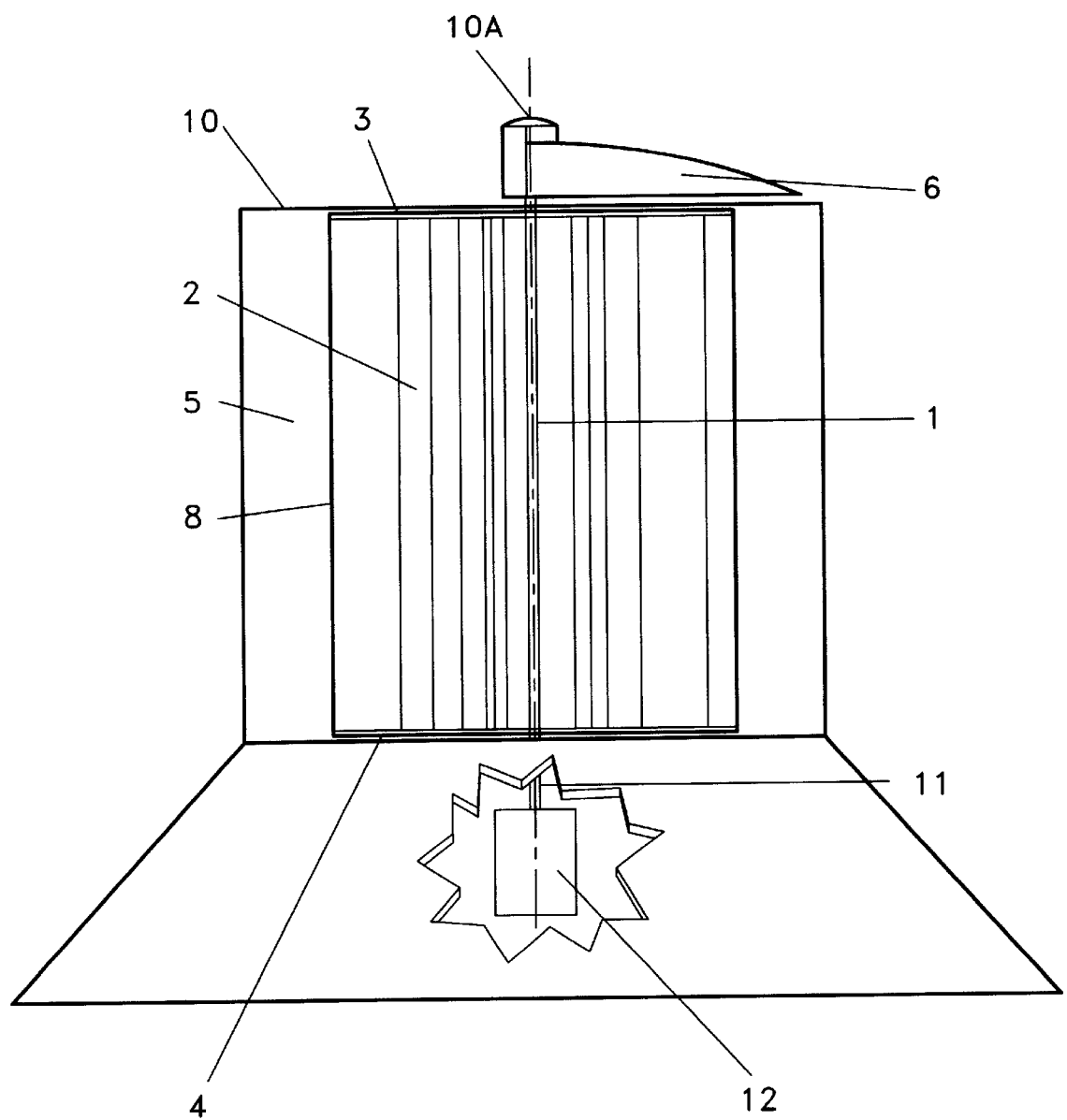

As can be seen from the drawings, the basic concepts of the present invention may be embodied in many different ways. FIG. 1 and 1A show the preferred embodiment of the wind turbine (8) having a shaft (1) that is turned by rotor blades (2) that are attached to a top rotor cage plate (3) and bottom rotor cage plate (4) then drive an energy-transfer element (11) and an energy-utilizing device (12) (both shown as contained within or at the base). The height of these rotor blades in one of the preferred embodiments is 4 feet 8 inches but will vary proportionally with the size of the unit built. Furthermore, in accordance with preferred embodiments of the present invention, from 2 to 5 blade elements may be used. Wind, and in some embodiments water or other fluid, is compressed and directed to the rotor blades (2) by numerous stator blades (5). Wind with a downward diagonal thrust can be accommodated by the rotor blades (2) through use of an open stator cage cover (10) that renders the turbine (8) at least partially topless and increases efficiency by up to an estimated 20% over any prior art. Wind attempting to enter the turbine (8) against the prevailing wind direction and hence against the direction of the rotors is deflected by top shield (6). Top shield (6) has a central pivoting point and an outer terminus and moves about the open top of turbine (8) by use of a center bearing (10A) side bearings (10B) and bearing race (10C). The movement of the top shield (6) to a downwind position is aided by the top shield vane (7). FIG. 1B depicts a second embodiment of the present invention wherein top shield (6) is not provided with a vane. The top shield (6) creates an area on the downwind side of the turbine (8) that is of low turbidity and increases the invention's ability to exhaust wind passing through the machine. The top shield (6) does not at any time hinder the accommodation of productive winds from any direction.

The above described features of an embodiment of the present invention may further be applicable to other fluid resources, such as water, and in particular, water turbines. The present invention, in alternative embodiments, may provide a fluid turbine system directed to particular fluid currents, and in some embodiments, water currents. The above description of the present invention, therefore, equally applies to systems for fluid currents, and in particular, water currents.

Figure 2:
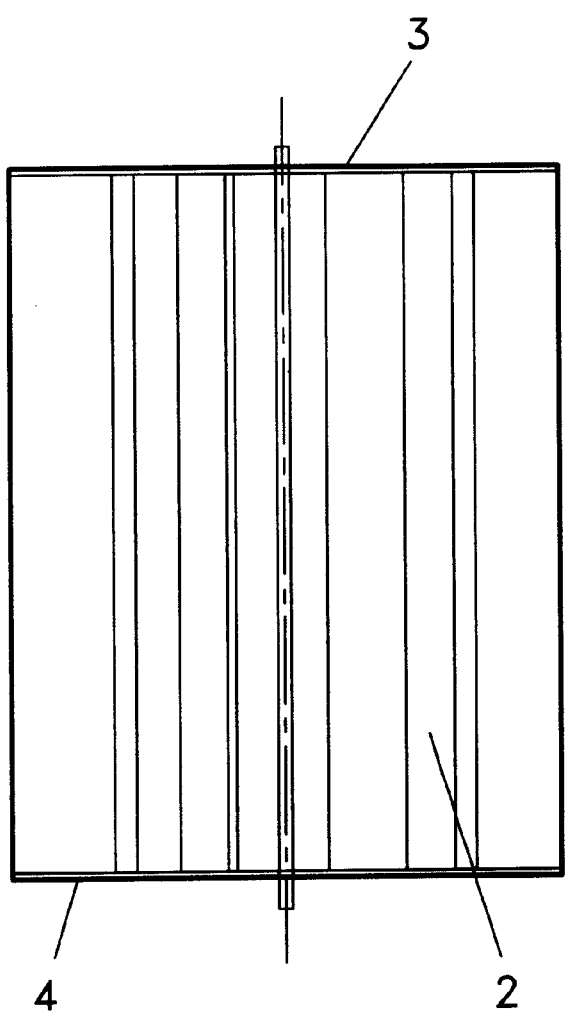
Figure 2A:
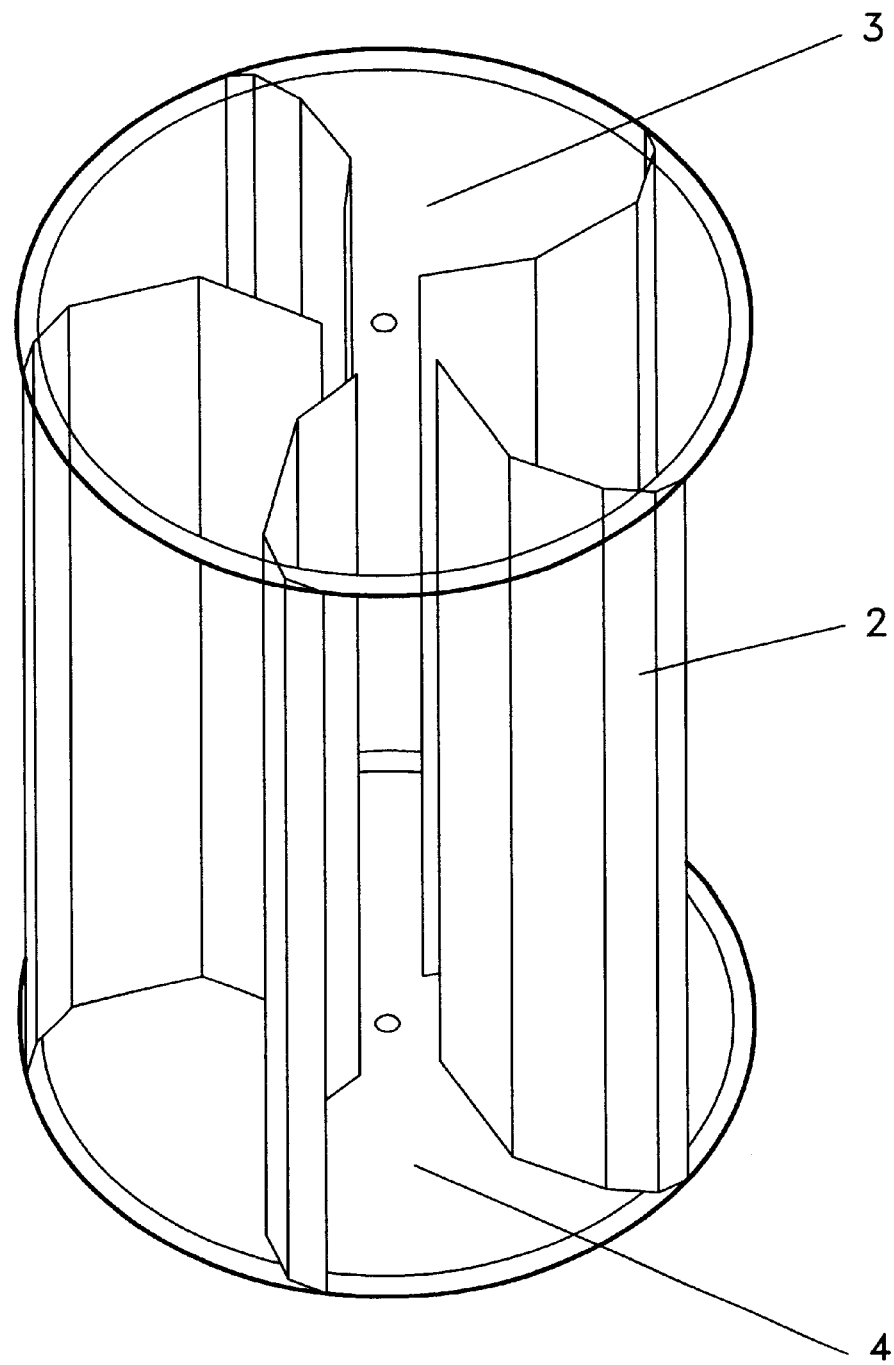

FIG. 2 and 2A show the rotor cage (1) which may be of a double wall design constructed of a lightweight composite material as is commonly used in the aircraft and boating industries. Total rigidity and structural integrity may be enhanced by the top rotor cage plate (3) and the bottom rotor cage plate (4).

Please note that the top plate (3) may be arced slightly to better compress and direct air or other fluid into the rotor cage. A reverse angle on the bottom rotor cage plate (4) may accomplish the same task but with an upward thrust.

Only the top and bottom rotor cage plates may be attached to the shaft. This unique aspect can aid in the invention's ability to readily accept, utilize and exhaust wind or other fluid. Structural integrity and rigidity may be enhanced by the rotor blades being attached in two places rather than directly to the shaft as in previous art. The present invention also provides particular embodiments directed to fluid currents, and in some embodiments, water currents. The above description equally applies to systems for fluid currents, and in particular, water currents.

Figure 3:
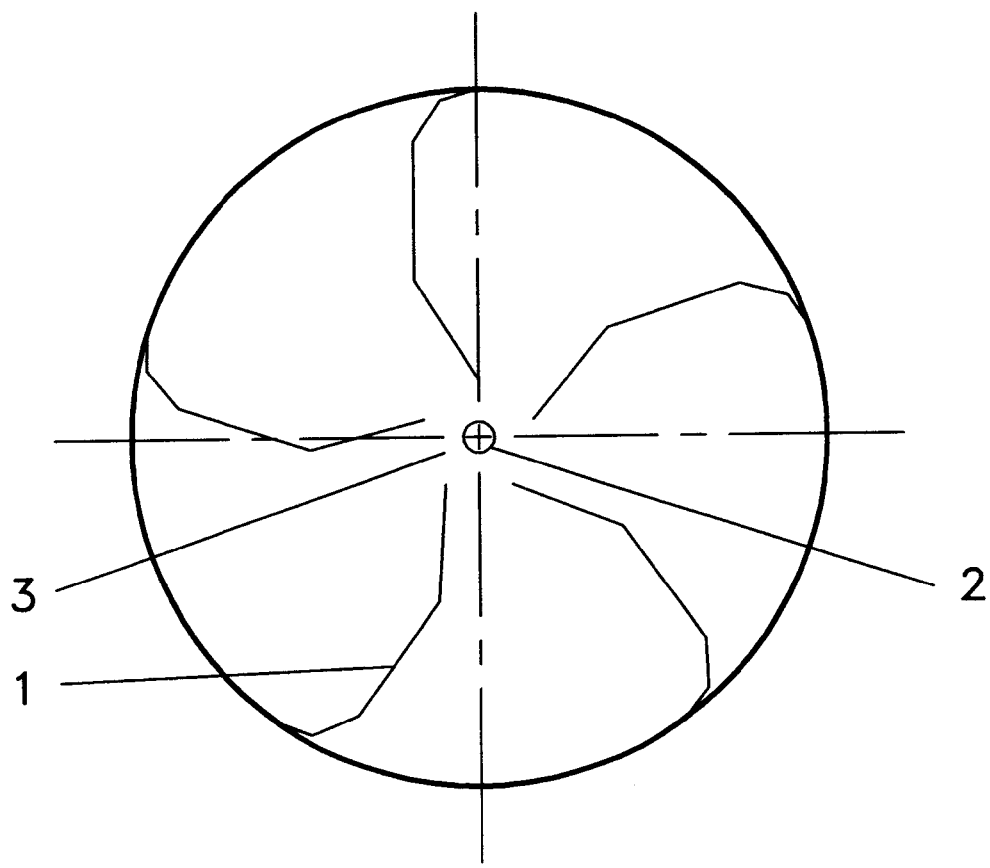

FIG. 3 shows the layout of the rotor blades (1) with respect to each other as well as to the shaft (2). Special note should be taken of the space (3) between the shaft (2) and the inside edge of the rotor blades (1). This space is a substantial component of one embodiment of the invention in a number of ways. First, by allowing some of the air, water, or other fluid to flow through the center of the machine, the air or water impacts the blade on the downwind side of the invention adding to thrust and aiding in the exhaust cycle. The space between the shaft and rotor can also achieve greater torque by pushing the kinetic energy of the wind or water current to be exerted further away from the center point (i.e., the shaft). The flat surfaces of the rotor blades allow wind or water current to impart its force and be immediately deflected. A curved or cupped surface (as described in previous art) may allow air or water to collect in the curvature and cushion the force of subsequent winds. The layout of the rotor cage in the preferred embodiment is shown but it must be mentioned that changes may be made to the layout without departing from the broad aspect of the present invention. Of course, the present invention may provide particular embodiments directed to fluid currents, and in some embodiments, water currents. The above description of the present invention equally applies to systems for fluid currents, and in particular, water currents.

The deflected air, water or other fluid from the rotor blades is also able to find its way through the space between the shaft and the rotor blades to aid in the invention's ability to exhaust. The space between the rotor blades and the shaft in the preferred embodiment vary proportionately with the size of the unit built.

Figure 4:
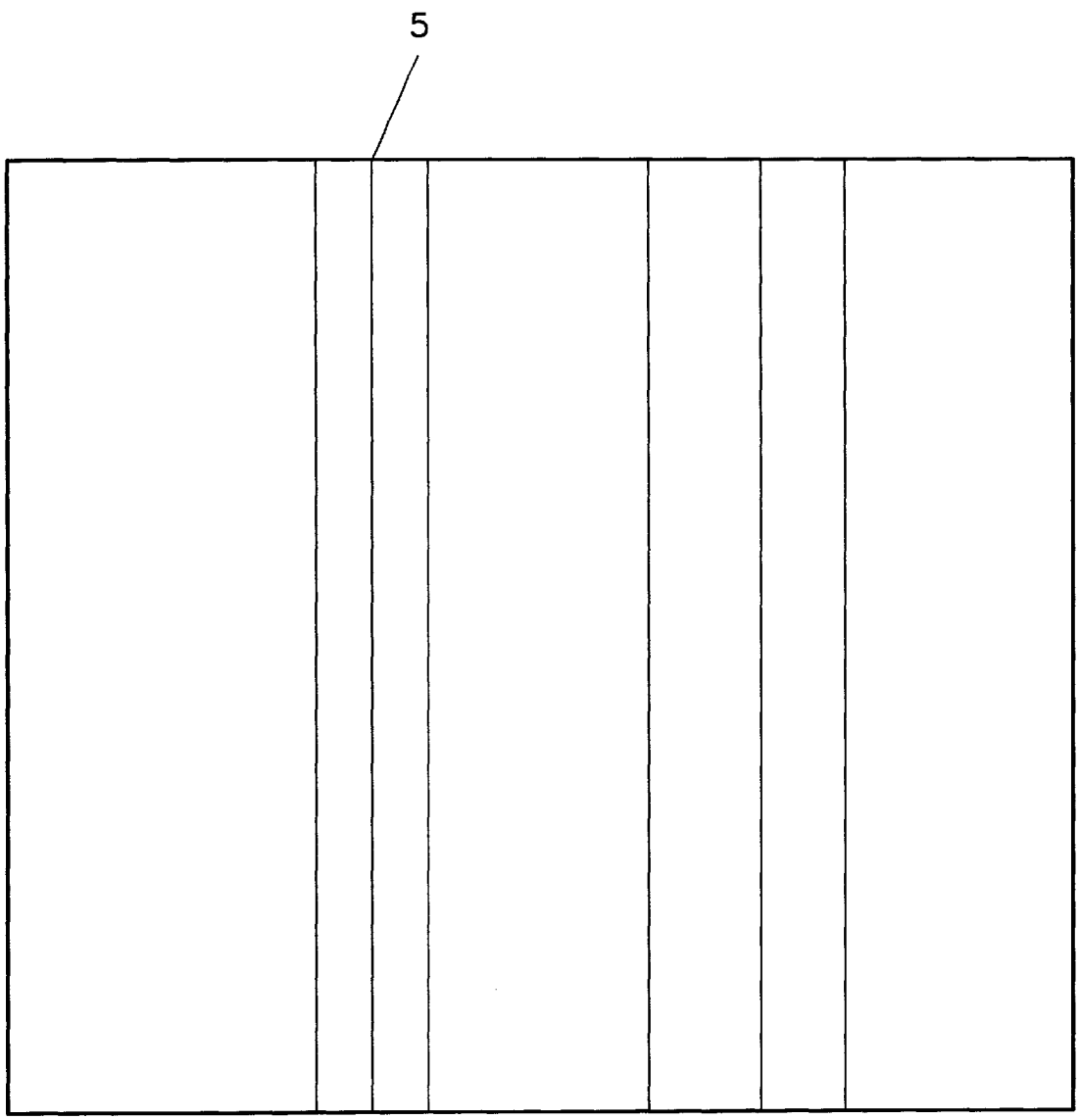
Figure 4A:
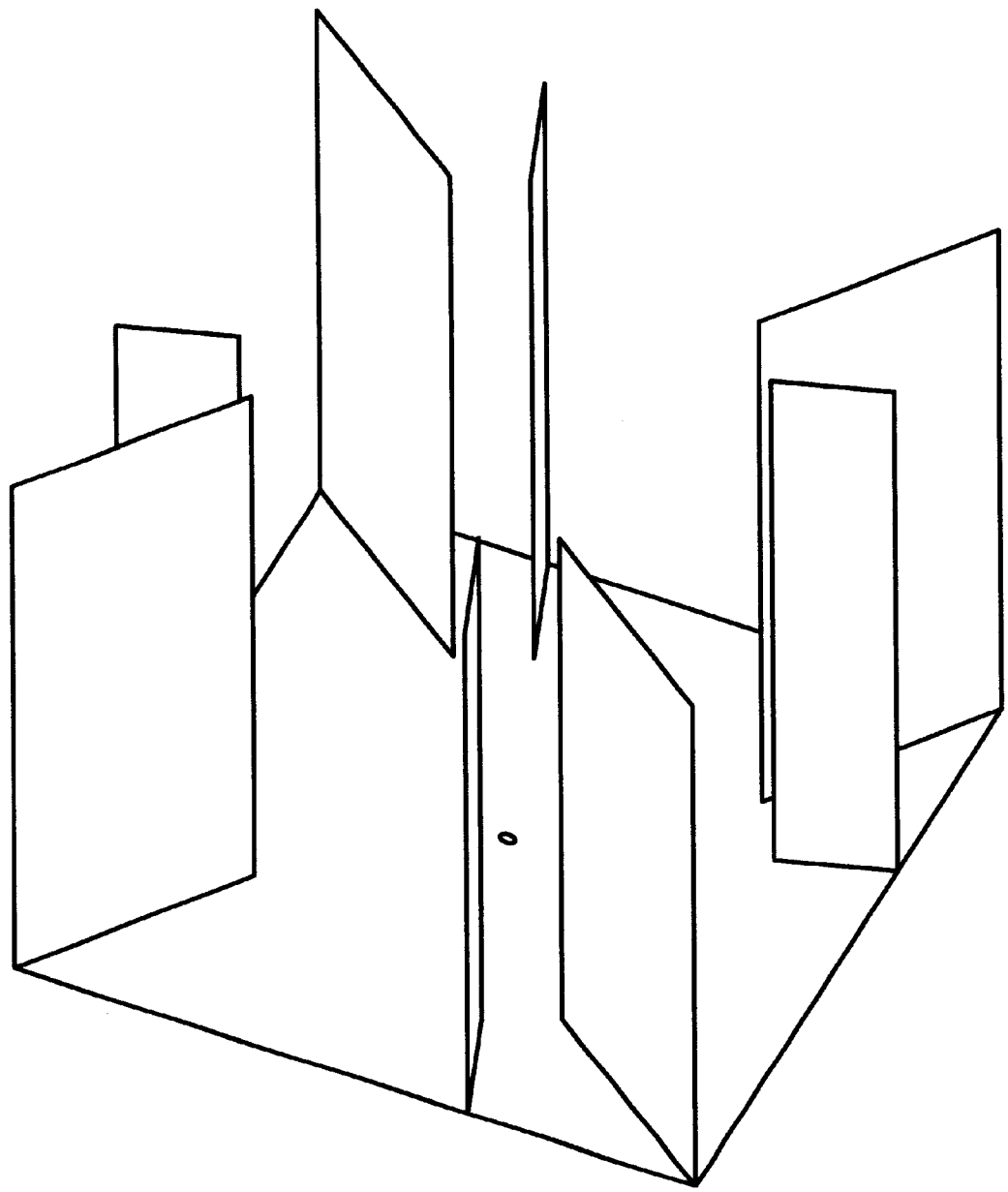
Figure 4B:
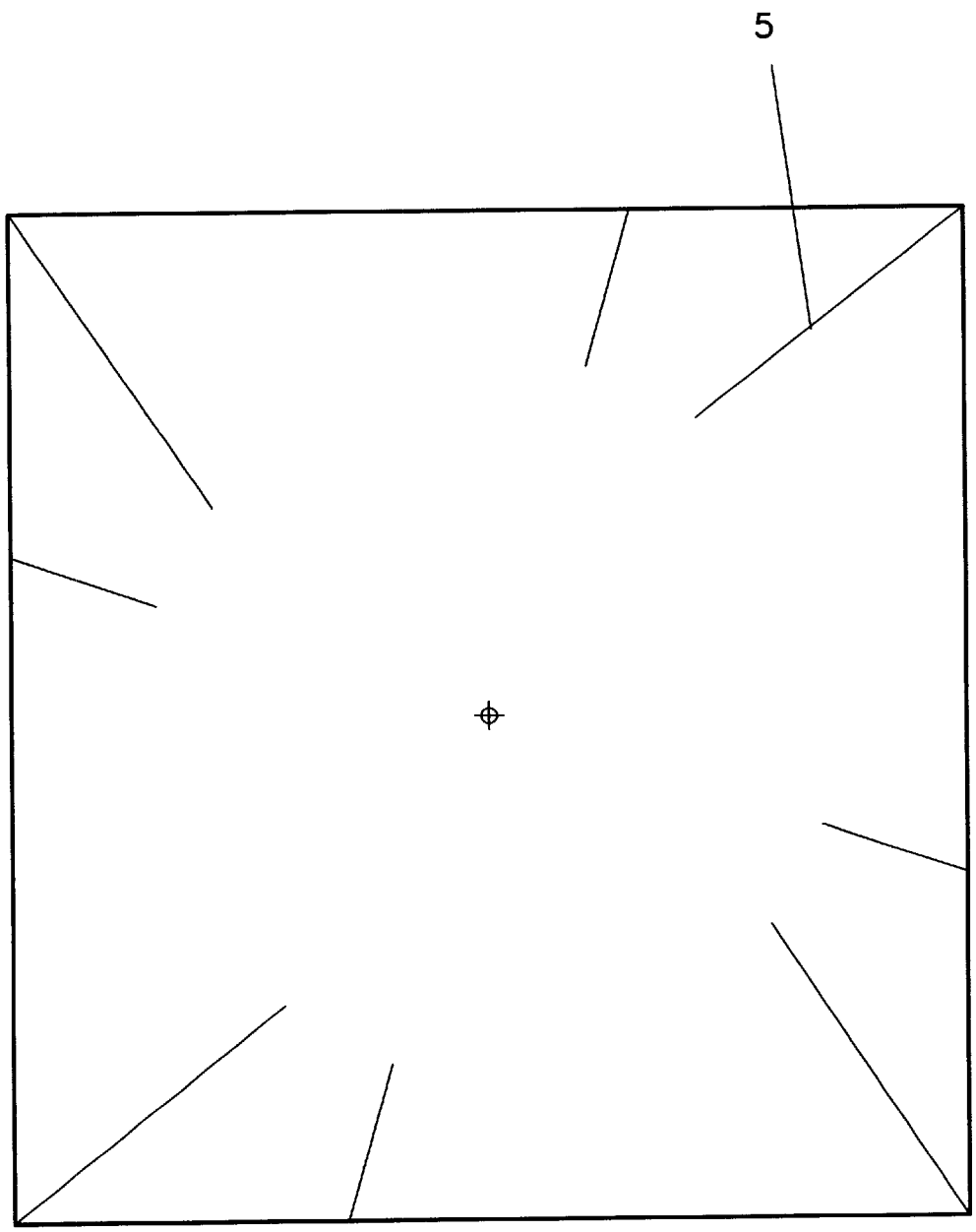

In FIG. 4, 4A and 4B, the stator blades (5) are arranged around the circumference of the rotor cage in equidistant pairs. In the preferred embodiment 8 blades are shown but more or fewer blades could be used without substantially departing from the broad aspect of the present invention. Unlike previous art, which had curved stator blades it has been found that straight stators that are offset from the center point allows air to enter the turbine with less turbidity and thus more force. When an attempt is made to bend or change the direction of air currents (as previous art has done with curved stator blades), or as in fluidic currents generally, such as water currents, the force of the wind may be greatly diminished. Straight stators, while directing air into the invention, can have a minimal effect on the loss of kinetic energy. The wind turbine has been designed to accept all available winds regardless of their speed and thus has no need for a stator design that would dampen or lessen the force of the wind. The stator blades may be constructed of the same lightweight composite as the rotor cage and are of a double wall design. The width of the double walls enhances structural stability and rigidity while the resultant stator blades are lightweight and are easily shipped and erected. Of course, the present invention may provide particular embodiments directed to fluid currents, and in some embodiments, water currents. The above description of the present invention equally applies to systems for fluid currents, and in particular, water currents.

The overall weight of the components can be an integral part of the invention. While mass (i.e., weight) can be used to dampen or deaden vibration, the new invention operates so smoothly that lightweight materials will not jeopardize structural integrity and will allow the turbine to be placed atop existing buildings or in environmentally sensitive areas or areas where large erection equipment would have no access, or in accordance with some embodiments of the present invention, either partially or completely submerged.

Figure 5:
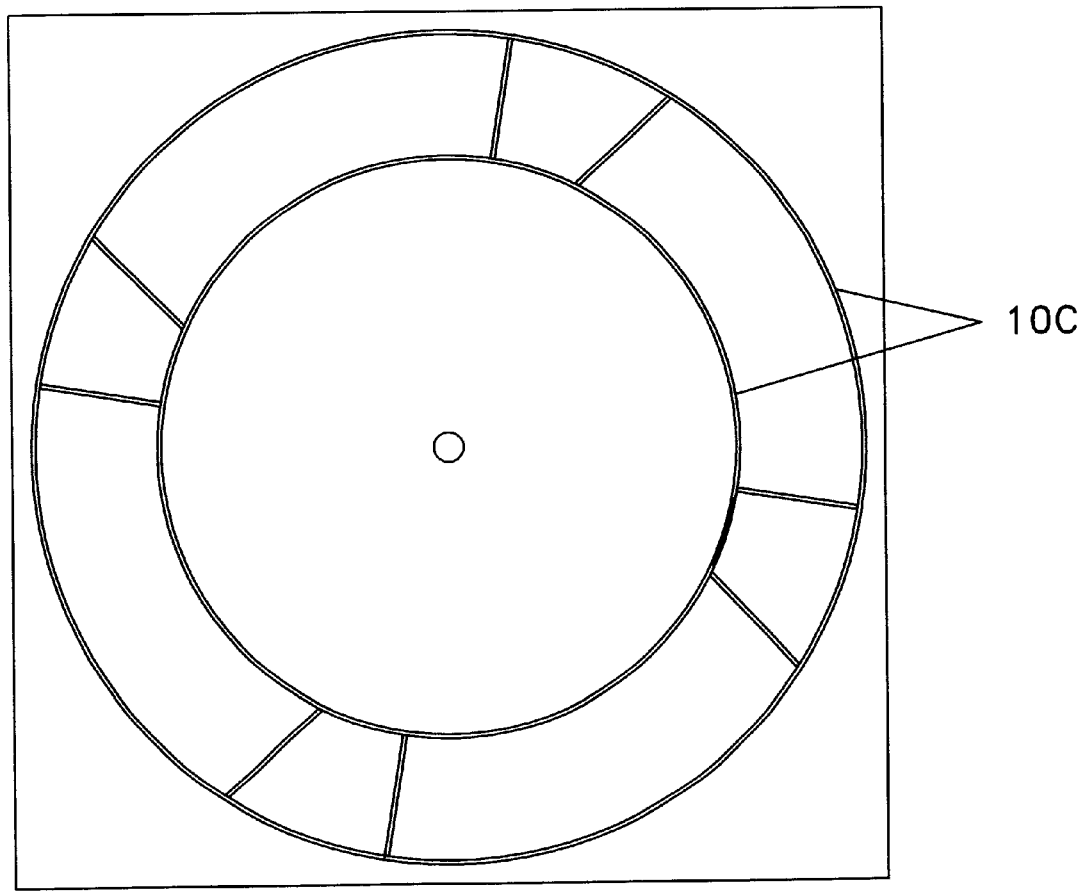

FIG. 5 depicts the alignment of the stator cage cover. This is the part of the invention that allows the turbine to be virtually topless with regard to incoming currents of air or water. Once properly attached to the stator blades, the turbine is structurally sound and is ready to withstand with regard to wind turbine embodiments, winds in excess of 100 m.p.h. Air currents approaching the rotor cage that have a slightly downward thrust pass through the open top (between the bearing races) and impact the rotor blades creating rotation. Previous art was able to accommodate wind currents that moved horizontally only, and thus, were able to accommodate only a portion of the wind that can be handled by the new invention. Of course, the present invention may provide particular embodiments directed to fluid currents, and in some embodiments, water currents. The above description of the present invention regarding current speed and direction equally applies to systems for fluid currents, and in particular, water currents.

The stator cage cover may be constructed of rigid steel with concentric braces to ensure structural stability. On the top side of the concentric braces are bearing races to accommodate the top shield bearings.

Figure 6:
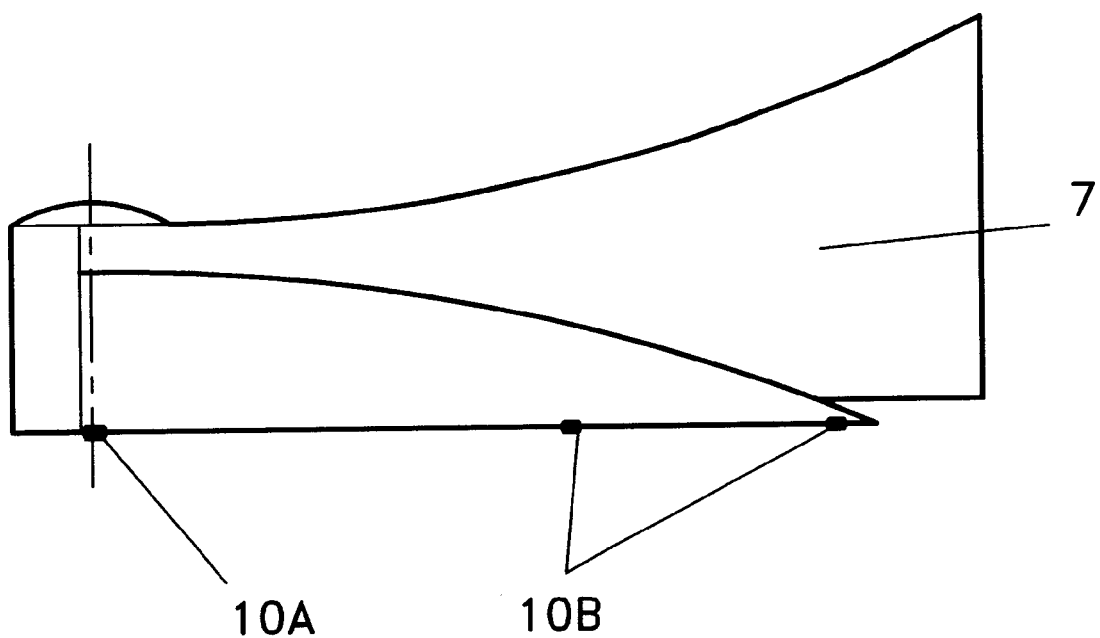
Figure 7:
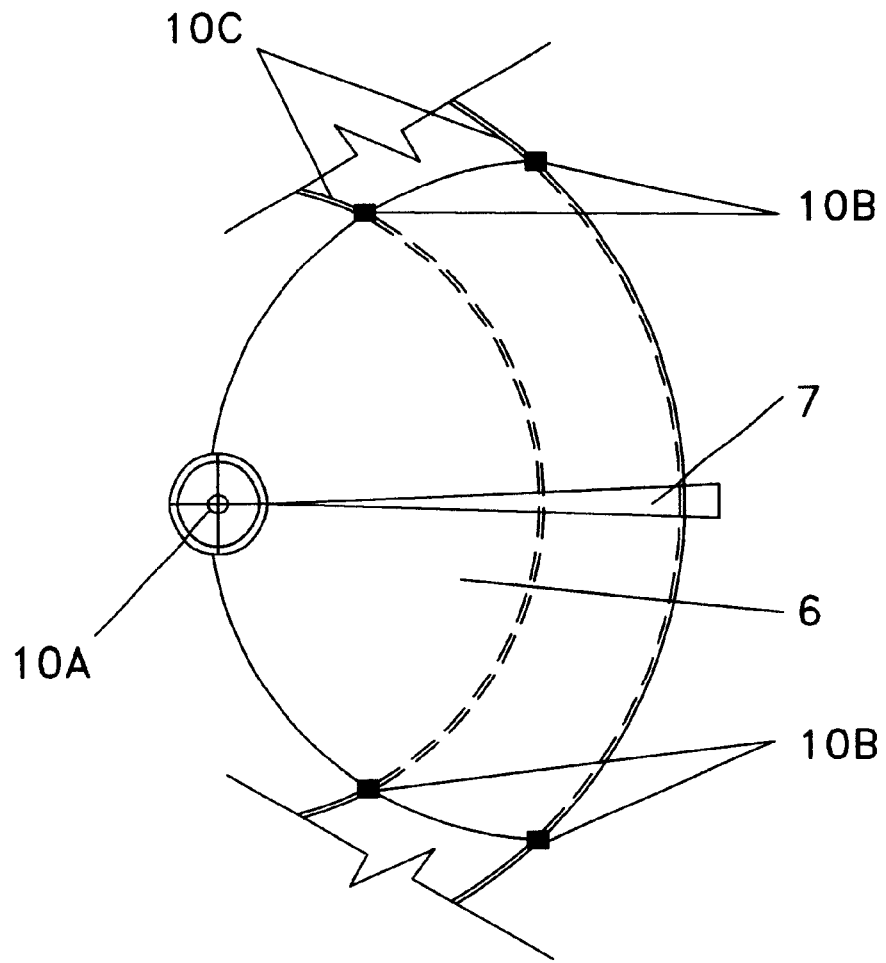

FIGS. 6 and 7 show the top shield and top shield vane (also constructed of lightweight composite). The top shield may be laminated for strength while the vane can be a double wall design to create enough drag to rotate the top shield to a downwind position. FIG. 1B depicts a second, alternative embodiment wherein the vane technique is not incorporated, such embodiment usable for any fluid current.

Once the shield is in proper position, wind or water with a downward thrust is also allowed to enter the wind or water turbine. (Modeling done to date shows that the open top embodiment increases performance by up to about 20%.) The top shield prevents conflicting winds or waters, or the current thereof, and in some embodiments down currents, from entering the invention from the downwind side that would interfere with rotation or exhausting. The space between the top shield and the rotor cage can create a space of calm air or water that may improve the invention's exhausting characteristics and that has a dampening feature. The front side or upwind or up current side of the top shield is slightly convex on the horizontal plane and may prevent the top shield from buffeting during periods of high winds or fast water currents. The center bearing (10A) of the top shield (6) can allow the mechanism to pivot easily while wheels or bearings (10B) resting on the concentric bearing races (10C) may carry the weight of the top shield. The wind or water vane or tail of the top shield (7) can aid in the top shield's ability to move into a position opposing the wind or water current and may enhance the shield's stability during operation.

It is important to note that the previously described invention may be applicable to fluid systems generally, and in some embodiments, is directed to water turbine systems. All of the disclosure presented herein should be considered enabling disclosure not only for wind turbines and systems thereof, but of systems and techniques for any fluid medium, and in some embodiments, to water and water currents.

As can be easily understood from the foregoing, the basic concepts of the present invention may be embodied in a variety of ways. It involves both the harnessing of kinetic energy techniques as well as devices to accomplish the appropriate harnessing of energy. In this application, the harnessing techniques are disclosed as part of the results shown to be achieved by the various devices described, including turbine systems, and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "shield" should be understood to encompass disclosure of the act of "shielding"—whether explicitly discussed or not—and, conversely, were there effectively disclosure of the act of "shielding", such a disclosure should be understood to encompass disclosure of a "shield" and even a "means for shielding". Such changes and alternative terms are to be understood to be explicitly included in the description.

Any patents, publications, or other references mentioned in this application for patent are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim at least: i) each of the turbine devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, and ix) methods and apparatuses substantially as described hereinbefore and with reference to any of the accompanying examples, and x) the various combinations and permutations of each of the elements disclosed. Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

I claim:

1. A vertically rotating water turbine, comprising:
   a. a water-collecting base with a bottom surface defining an area and a top surface defining an area wherein said area of said bottom surface is larger than said area of said top surface and wherein said top surface comprises an energy-transfer element and wherein said water-collecting base comprises an upward tapered base having an angle to smoothly direct water currents;
   b. a vertically rotating shaft with a top end and a bottom end wherein said bottom end is mechanically connected to said energy-transfer element;
   c. an energy-utilizing device responsive to said shaft through said energy-transfer element of the top surface of said base;
   d. a round top plate attached in the vicinity of the top end of said vertically rotating shaft;
   e. a round bottom plate that defines a diameter and is attached to said vertically rotating shaft at a location above the top surface of said base;
   f. a plurality of vertically oriented torque generating elements having outer edges and inner edges which are located circumferentially around said vertically rotating shaft between said round top plate and said round bottom plate and are attached to said round top plate and said round bottom plate at their ends to form a cage assembly;
   g. a plurality of vertically oriented flat water directing elements arranged circumferentially around said cage assembly and adjacent to said outer edges of said vertically oriented flat torque generating elements;
   h. an open cover comprising concentric braces comprising two side bearings; and
   i. a top shield having a central pivoting point and an outer terminus above said side bearings of said open cover.

2. A vertically rotating water turbine as described in claim 1 wherein said angle to smoothly direct water currents is between 20° to 45°.

3. A vertically rotating water turbine as described in claim 2 wherein said top surface of said base comprises a square surface, wherein said bottom surface of said base comprises 8 corners and wherein said base comprises a special spacial geometry that has planar surfaces connecting said bottom surface to said top surface.

4. A vertically rotating water turbine as described in claim 1 wherein said vertically rotating shaft is responsive to said cage assembly and passively rotates.

5. A vertically rotating water turbine as described in claim 1 wherein each of said plurality of vertically oriented torque generating elements is solely attached to said round top plate and said round bottom plate at its ends to form said cage assembly.

6. A vertically rotating water turbine as described in claim 5 wherein each of said torque generating elements has at least three differently oriented surfaces.

7. A vertically rotating water turbine as described in claim 6 wherein each adjacent pair of said differently oriented surfaces comprises an angle wherein said angle is about 147°.

8. A vertically rotating water turbine as described in claim 7 wherein said plurality of said torque generating elements comprises from 2 to 5 torque generating elements.

9. A vertically rotating water turbine as described in claim 8 wherein said torque generating elements are free from said vertically rotating shaft wherein each of said inner edges of said torque generating elements and said vertically rotating shaft form a free space.

10. A vertically rotating water turbine as described in claim 9 wherein said free space comprises an exhaust space.

11. A vertically rotating water turbine as described in claim 9 wherein said torque generating elements comprise rotor blades.

12. A vertically rotating water turbine as described in claim 11 wherein each of said rotor blades is about 4'8" in height.

13. A vertically rotating water turbine as described in claim 12 wherein said rotor blades immediately accommodate all water conditions from the full 360 degrees.

14. A vertically rotating water turbine as described in claim 13 wherein said cage assembly comprises a rotor cage assembly wherein said top round plate is a top rotor cage plate and said bottom round plate is a bottom rotor cage plate.

15. A vertically rotating water turbine as described in claim 14 wherein said rotor blades are capable of imparting rotation force upon said vertically rotating shaft indirectly through said rotor cage assembly during periods of sufficient water currents.

16. A vertically rotating water turbine as described in claim 15 wherein said rotor cage assembly is capable of responding to a change in current direction.

17. A vertically rotating water turbine as described in claim 16 wherein said rotor blades have a double wall design.

18. A vertically rotating water turbine as described in claim 1 wherein said flat water directing elements are attached to said base in equidistance pairs.

19. A vertically rotating water turbine as described in claim 18 wherein said flat water directing elements comprise at least two pairs.

20. A vertically rotating water turbine as described in claim 19 wherein said flat water directing elements comprise at least four pairs.

21. A vertically rotating water turbine as described in claim 20 wherein each pair of said flat water direct elements are circumferentially arranged on said base and comprise a water current pathway with an entrance opening larger than an exit opening toward said rotor blades.

22. A vertically rotating water turbine as described in claim 20 wherein said flat water directing elements comprise stationary stator blades.

23. A vertically rotating water turbine as described in claim 22 wherein said stator blades comprise flat vertical surfaces that have a minimal coefficient of friction when water currents pass through them.

24. A vertically rotating water turbine as described in claim 23 wherein said stator blades each face a specific direction to sufficiently accommodate water current from that specific direction.

25. A vertically rotating water turbine as described in claim 24 wherein said stator blades comprise double walls.

26. A vertically rotating water turbine as described in claim 1 wherein said open cover comprises an open stator cage cover.

27. A vertically rotating water turbine as described in claim 26 wherein said open stator cage cover comprises concentric bearing races that have a center bearing and two circular side bearings.

28. A vertically rotating water turbine as described in claim 1 wherein said top shield comprises a laminated top shield.

29. A vertically rotating water turbine as described in claim 24 and further comprising a calm water surface which forms a calm water area above at least a portion of said cage assembly.

30. A vertically rotating water turbine as described in claim 29 wherein said calm water surface comprises a convex surface on its up current side and a concave surface on its downcurrent side, wherein said downcurrent side forms said calm water area above said cage assembly.

31. A vertically rotating water turbine as described in claim 29 or 30 wherein said calm water area comprises an exhaust area.

32. A vertically rotating water turbine as described in claim 31 wherein said top shield covers less than about one third of said open cover area above said open cover.

33. A vertically rotating water turbine as described in claim 32 wherein said central pivoting point of said top shield is responsive to said central bearing of said open cover, wherein said outer terminus is responsive to said outer side bearing and wherein said top shield rotates in response to water direction.

34. A vertically rotating water turbine as described in claim 33 wherein said top shield enhances water harness and wherein said top shield comprises a vane.

35. A vertically rotating water turbine as described in claim 34 wherein said vane creates enough drag force to rotate said top shield to a downcurrent position in response to water directions and comprises double walls.

36. A vertically rotating water turbine as described in claim 1 wherein said water turbine comprises a long axis vertical turbine that is an omnicurrent turbine.

37. A vertically rotating water turbine as described in claims 1, 6, 12, 19, 25, 28, 36 wherein each of said elements comprises a lightweight material.

38. A method of harnessing kinetic energy from water currents, comprising the steps of:
    a. providing a base on which a water turbine is set and in which an energy utilizing device is located;
    b. providing a torque generating device on said base wherein said torque generating device comprises torque generating elements, a top plate, a bottom plate and a vertical shaft;
    c. providing a kinetic energy cascade pathway wherein kinetic energy from water currents is transferred from said torque generating elements to said shaft via said top and bottom plates;
    d. directing water currents from slow to fast currents regardless of direction onto said torque generating elements;
    e. compressing said water currents by gradually narrowing their pathways toward said torque generating elements to generate compressed water currents;
    f. collecting said compressed water currents;
    g. moving said torque generating elements around said shaft with said water currents;
    h. generating a torque force using said kinetic energy;
    i. converting said torque force into mechanical energy;
    j. driving said energy utilizing device with said mechanical energy; and
    k. smoothly exhausting said water currents.

39. A method of harnessing kinetic energy from water currents as described in claim 38 wherein said step of providing abase comprises the step of improving structural integrity of said water turbine by steadily attaching said water turbine to said base.

40. A method of harnessing kinetic energy from water currents as described in claim 38 and further comprising the step of creating a free water passing area in said water turbine.

41. A method of harnessing kinetic energy from water currents as described in claim 38 wherein said step of providing a kinetic energy cascade pathway comprises the step of utilizing a water directing base.

42. A method of harnessing kinetic energy from water currents as described in claim 41 wherein said step of providing a torque generating device comprises the step of utilizing curved torque generating elements.

43. A method of harnessing kinetic energy from water currents as described in claim 41 wherein said step of providing a torque generating device comprises the step of utilizing angled torque generating elements.

44. A method of harnessing kinetic energy from water currents as described in claim 43 wherein said step of providing a kinetic energy cascade pathway comprises the step of minimizing number of moving parts in said water turbine.

45. A method of harnessing kinetic energy from water currents as described in claim 44 wherein said step of minimizing said number of moving parts in said water turbine comprises the step of minimizing the number of said angled torque generating elements.

46. A method of harnessing kinetic energy from water currents as described in claim 45 wherein said step of providing a torque generating device on said base comprises the step of attaching said torque generating elements to said top plate and said bottom plate at their ends.

47. A method of harnessing kinetic energy from water currents as described in claim 46 wherein said step of providing a torque generating device on said base comprises the step of attaching said torque generating elements solely to said top plate and said bottom plate at their ends.

48. A method of harnessing kinetic energy from water currents as described in claim 47 wherein said step of providing a torque generating device comprises the step of efficiently utilizing water kinetic energy to generate said torque force.

49. A method of harnessing kinetic energy from water currents as described in claim 48 wherein said step of efficiently utilizing water kinetic energy to generate said torque force comprises the step of accommodating water currents from the full 360 degrees.

50. A method of harnessing kinetic energy from water currents as described in claim 49 wherein said step of efficiently utilizing water kinetic energy to generate said torque force comprises the step of accommodating all water conditions from slow to medium to fast water conditions.

51. A method of harnessing kinetic energy from water currents as described in claim 50 wherein said step of accommodating comprises the step of reducing weight of said water turbine by constructing said water turbine with lightweight materials.

52. A method of harnessing kinetic energy from water currents as described in claims 38, 41, 44, and 46 wherein said step of providing a kinetic energy cascade pathway comprises the step of combining said torque generating elements, said top plate, said bottom plate and said vertical shaft in a way that said torque force is transferred from said torque generating elements to said vertical shaft indirectly via said top plate and said bottom plate.

53. A method of harnessing kinetic energy from water currents as described in claim 38 wherein said step of directing water currents from slow to fast currents regardless of direction onto said torque generating elements comprises the step of defining pathways of said water currents.

54. A method of harnessing kinetic energy from water currents as described in claim 53 wherein said step of compressing said water currents comprises the step of concentrating strength of said kinetic energy.

55. A method of harnessing kinetic energy from water currents as described in claim 54 wherein said step of moving said torque generating elements comprises the step of imparting high rotational velocity upon said vertical shaft.

56. A method of harnessing kinetic energy from water currents as described in claim 54 wherein said step of moving said torque generating elements comprises the step of optimizing a rotating velocity of said vertical shaft.

57. A method of harnessing kinetic energy from water currents as described in claim 56 wherein said step of converting said torque force into mechanical energy comprises the step of transferring said torque force from said vertical shaft to said energy utilizing device.

58. A method of harnessing kinetic energy from water currents as described in claim 38 wherein said step of efficiently collecting said water kinetic energy with said torque generating elements comprises the step of efficiently collecting kinetic energy from water currents from above said water turbine.

59. A method of harnessing kinetic energy from water currents as described in claim 58 wherein said step of efficiently collecting kinetic energy from water currents above said water turbine comprises the step of opening said water turbine from its top.

60. A method of harnessing kinetic energy from water currents as described in claim 54 wherein said step of efficiently collecting kinetic energy from water currents above said water turbine comprises the step of preventing counter-prevailing water currents from imparting upon said torque generating elements.

61. A method of harnessing kinetic energy from water currents as described in claim 60 wherein said step of preventing counter-prevailing water currents from imparting upon said torque generating elements comprises the step of shielding at least a partial opening area of said water turbine.

62. A method of harnessing kinetic energy from water currents as described in claim 61 wherein said step of shielding at least a partial opening area of said water turbine comprises the step of providing a calm water area on a downcurrent side with standard stability.

63. A method of harnessing kinetic energy from water currents as described in claim 62 wherein said step of preventing counter-prevailing water currents from imparting upon said torque generating elements comprises the step of shielding a downcurrent area above said water turbine.

64. A method of harnessing kinetic energy from water currents as described in claim 38 wherein said step of smoothly exhausting said water currents comprises the step of building a free water current escape passway.

65. A method of harnessing kinetic energy from water currents as described in claim 64 wherein said step of smoothly exhausting said water currents comprises the step of constructing a calm area with standard stability.

66. A vertically rotating water turbine, comprising:
  a. a base with a bottom surface defining an area and a top surface defining an area wherein said area of said bottom surface is larger than said area of said top surface and wherein said top surface comprises an energy-transfer element and wherein said base comprises an upward tapered base having an angle to smoothly direct water currents;
  b. a vertically rotating shaft with a top end and a bottom end wherein said bottom end is mechanically connected to said energy-transfer element;
  c. an energy-utilizing device responsive to said shaft through said energy-transfer element of the top surface of said base;

d. a round top plate attached to said vertically rotating shaft;

e. a round bottom plate that defines a diameter and is attached to said vertically rotating shaft;

f. a plurality of vertically oriented flat torque generating elements having outer edges and inner edges which are localized circumferentially around said vertically rotating shaft at a space between said round top plate and said bottom plate and are attached therein to said round top plate and said bottom plate at their ends to form a cage assembly;

g. a plurality of vertically oriented flat water directing elements arranged circumferentially around said cage assembly and adjacent to said out edges of said vertically oriented flat torque generating elements;

h. an open cover comprising concentric braces; and i. a dampening top shield above said open cover having a central pivoting point and a convex front side surface with an outer terminus above said concentric braces above said open cover.

67. A vertically rotating water turbine as described in claim 66 wherein said dampening top shield further comprises a shield of exhausting water against counterprevailing water currents.

68. A vertically rotating water turbine as described in claim 66 further comprising a top shield vane wherein said dampening top shield is responsive to said top shield vane.

69. A method of harnessing kinetic energy water currents, said method comprising the steps of:

a. establishing a base on which a water turbine is set and in which an energy utilizing device is located;

b. creating a torque generating device on said base wherein said torque generating device comprises torque generating elements, a round top plate, a round bottom plate and a vertical shaft;

c. creating a kinetic energy cascade pathway wherein said kinetic energy is transferred from said torque generating elements to said shaft via said top and bottom plates;

d. directing water currents from slow to medium to fast currents regardless of direction onto said torque generating elements;

e. directionally compressing said water currents by gradually narrowing their pathways toward said torque generating elements to generate compressed water currents;

f. creating a top shield having an up current surface;

g. dampening said torque generating elements with said top shield to accommodate high water force;

h. collecting said compressed water currents;

i. kinetically, vertically and axially imparting said torque generating elements around a shaft with water currents;

j. generating a torque force using said kinetic energy;

k. converting said torque force into mechanical energy;

l. driving said energy utilizing device with said mechanical energy; and m. smoothly exhausting water.

70. A method of harnessing kinetic energy from water current conditions as described in claim 69 wherein said step of creating a top shield having an up current surface comprises the step of creating a calm water area with standard stability.

* * * * *